United States Patent
Allen et al.

(10) Patent No.: US 9,257,833 B2
(45) Date of Patent: Feb. 9, 2016

(54) ADAPTIVE TOPOLOGY ASSISTED PROTECTION AND CONTROL OF ELECTRIC POWER DELIVERY SYSTEMS

(71) Applicant: Schweitzer Engineering Laboratories, Inc., Pullman, WA (US)

(72) Inventors: William F. Allen, Airdrie (CA); Dennis Haes, Colfax, WA (US); Bryan J. Fazzari, Cumming, GA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 206 days.

(21) Appl. No.: 14/225,796

(22) Filed: Mar. 26, 2014

(65) Prior Publication Data

US 2014/0293494 A1    Oct. 2, 2014

Related U.S. Application Data

(60) Provisional application No. 61/806,308, filed on Mar. 28, 2013.

(51) Int. Cl.

| | | |
|---|---|---|
| *H02H 3/20* | (2006.01) | |
| *H02H 9/04* | (2006.01) | |
| *H02H 7/20* | (2006.01) | |
| *H02H 1/00* | (2006.01) | |
| *H02H 7/26* | (2006.01) | |

(Continued)

(52) U.S. Cl.
CPC ............... *H02H 7/20* (2013.01); *H02H 1/0061* (2013.01); *H02H 1/0092* (2013.01); *H02H 7/261* (2013.01); *H02J 13/0006* (2013.01); *Y10T 307/469* (2015.04)

(58) Field of Classification Search
CPC ............ H02H 3/20; H02H 9/04; H02H 9/041
USPC ......................................................... 361/93.1
See application file for complete search history.

(56) References Cited

U.S. PATENT DOCUMENTS

| | | |
|---|---|---|
| 4,994,934 A | 2/1991 | Bouhenguel |
| 5,097,380 A | 3/1992 | Moran |

(Continued)

OTHER PUBLICATIONS

PCT/US2014/031839 Patent Cooperation Treaty, International Search Report and Written Opinion of the International Searching Authority, Sep. 4, 2014.

(Continued)

*Primary Examiner* — Dharti Patel
(74) *Attorney, Agent, or Firm* — Jared L. Cherry; Richard M. Edge

(57) ABSTRACT

Disclosed are adaptive communication assisted protection and control. Local intelligent electronic devices (IEDs) associated with local switching devices and having unique IDs may transmit switch status and unique IDs to an area IED. The area IED may calculate topology using switch status, and provide control information to local IEDs using the topology. The area IED may communicate the unique ID of the local IED calculated to be immediately upstream of each local IED and, upon detection of a fault, the local IEDs may send blocking signals that include the received unique ID of the IED immediately upstream therefrom. The area IED may communicate control commands that include the unique IDs and control commands for the local IEDs to take the control action. Upon matching of the unique ID in the control command with its own unique ID, the local IEDs may take the control action and transmit remaining actions.

29 Claims, 9 Drawing Sheets

(51) Int. Cl.
*H02J 13/00* (2006.01)
*H02H 3/08* (2006.01)
*H02H 9/02* (2006.01)

(56) References Cited

U.S. PATENT DOCUMENTS

| | | |
|---|---|---|
| 5,237,511 A | 8/1993 | Caird |
| 5,303,112 A | 4/1994 | Zulaski |
| 5,373,411 A | 12/1994 | Grass |
| 5,513,061 A | 4/1996 | Gelbien |
| 5,629,825 A | 5/1997 | Wallis |
| 5,896,302 A | 4/1999 | Goodpaster |
| 5,973,899 A | 10/1999 | Williams |
| 6,005,759 A | 12/1999 | Hart |
| 6,008,971 A | 12/1999 | Duba |
| 6,212,049 B1 | 4/2001 | Spencer |
| 6,239,960 B1 | 5/2001 | Martin |
| 6,341,054 B1 | 1/2002 | Walder |
| 6,459,998 B1 | 10/2002 | Hoffman |
| 6,549,880 B1 | 4/2003 | Willoughby |
| 6,577,963 B1 | 6/2003 | Cordray |
| 6,667,866 B1 | 12/2003 | LaPlace |
| 6,704,181 B2 | 3/2004 | Saksa |
| 6,707,655 B2 | 3/2004 | McElray |
| 6,816,757 B1 | 11/2004 | De La Ree |
| 6,944,555 B2 * | 9/2005 | Blackett ............... G06Q 50/06 702/57 |
| 7,414,819 B2 | 8/2008 | Lee |
| 2002/0101695 A1 | 8/2002 | Saksa |
| 2002/0131222 A1 | 9/2002 | McClure |
| 2004/0138834 A1 * | 7/2004 | Blackett ............... G06Q 50/06 702/62 |
| 2007/0055889 A1 | 3/2007 | Henneberry |
| 2011/0313586 A1 * | 12/2011 | Popescu ............. H02J 13/0006 700/295 |
| 2014/0104738 A1 * | 4/2014 | Schweitzer, III ........ H02H 3/08 361/87 |
| 2014/0108851 A1 * | 4/2014 | Ishchenko ............. G06F 11/07 714/2 |

OTHER PUBLICATIONS

Cooper Power Systems, Type LS Loop Sectionalizing Control Installation and Operation Instructions, Apr. 2001.
Cooper Power Systems, Form 6-LS Pole Mount Recloser Control Installation and Operation Instructions, Dec. 2004.

* cited by examiner

ADAPTIVE TOPOLOGY ASSISTED PROTECTION AND CONTROL OF ELECTRIC POWER DELIVERY SYSTEMS

RELATED APPLICATION

This application claims the benefit under 35 U.S.C. §119 (e) of U.S. Provisional Application No. 61/806,308, filed on 28 Mar. 2013, naming Dennis Haes, Will Allen, and Bryan Fazzari as inventors, and titled "Adaptive Communication Assisted Protection and Control for Evolving Power System Topology with Wide Area Context" which is hereby incorporated by reference herein in its entirety.

FEDERALLY SPONSORED RESEARCH OR DEVELOPMENT

This invention was made with U.S. Government support under contract no.: DOE-0E0000280. The U.S. Government may have certain rights in this invention.

TECHNICAL FIELD

This disclosure relates to systems and methods for informing local protection and control devices of relevant aspects of the neighboring power system topology and for adapting the behavior of the local device as it participates in a communication assisted protection or control scheme. The relevant aspects of the topology may be related to other system conditions such as loading levels, voltage levels, and equipment availability.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
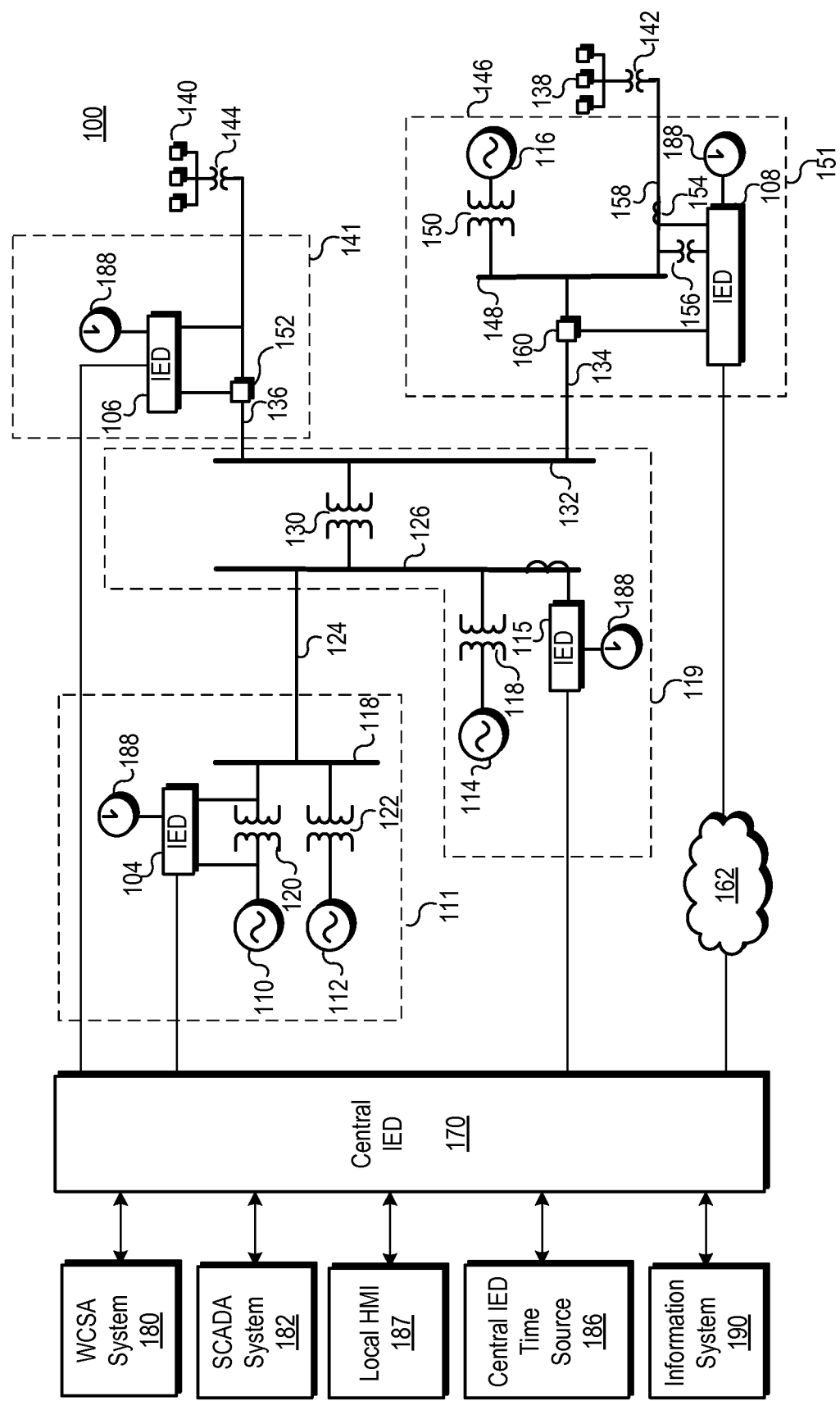
FIG. 1 illustrates a simplified one-line diagram of an electric power delivery system and associated IEDs consistent with various embodiments disclosed herein.

Electric power delivery systems may include electric power generation, transmission, and distribution equipment and loads that produce and consume the electric power. For example, such systems include various types of equipment such as generators, transformers, circuit breakers, switches, distribution lines, transmission lines, buses, capacitor banks, reactors, loads, and the like. A purpose of electric power delivery systems is to generate and deliver usable electric power to an end user or load. Often, the generation sites are located at great distances from an end user or load. Generated electric power is typically at a relatively low voltage, but is transformed into a relatively high voltage before entering a transmission system. The voltage is again reduced for the delivery system, and often reduced yet again before ultimate delivery to the end user or load. The electric power may be monitored and controlled at various stages in the delivery system. Intelligent electronic devices (IEDs) are often used to collect electric power system information, make control and/or protection decisions, take control, automation, and/or protection actions, and/or monitor the electric power delivery system.

Electric power delivery system configuration (also referred to as topology or context) may be modified due to protection or control actions taken by IEDs. Upon such modification, it may be difficult to maximize the effectiveness of subsequent protection and unless the protection and control system is aware of modifications to the topology. For example, volt/VAR control can be used to achieve several different goals, including voltage profile optimization, conservation voltage reduction (CVR), and power factor correction; however, its application can be somewhat rigid in that it tends to be unable to adapt to changes in feeder length or, worse, its settings are unable to handle topology changes that cause a device to suddenly belong to another feeder entirely. Similarly, a protection action may modify the topology, making subsequent restoration actions less effective due to insufficient margin to restore power, or closing switching devices that would not restore power to the greatest number of customers.

These automated changes in system topology also cause problems with trip blocking schemes, such as an IEC 61850 Generic Object-Oriented Substation Event based (GOOSE-based) blocking scheme. This disclosure describes how these two technologies have been integrated into an automated fault detection, isolation, and restoration (FDIR) scheme to provide both an effective volt/VAR control system and a dynamic, system-wide, high-speed trip blocking scheme that can be flexible and continue functioning as the system topology changes.

This disclosure relates to systems and methods for informing local protection and control devices of relevant aspects of the neighboring power system topology and for adapting the behavior of the local device as it participates in a communication assisted protection or control scheme. The relevant aspects of the topology may be related to other system conditions such as loading levels, voltage levels, and equipment availability. Various systems and methods consistent with the present disclosure may allow the wide area context (e.g., topology) to inform local decisions with limited degradation of the overall speed of the system response. Each local IED may make a comparison of whether the device identifier embedded in a message is equal to the identifier of the local IED.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified one-line diagram of an electric power delivery system 100 and associated IEDs 104, 106, 108, 115, and 170 consistent with certain embodiments disclosed herein. System 100 includes various substations and IEDs 104, 106, 108, 115, and 170 configured to perform various functions. System 100 is provided for illustrative purposes and does not imply any specific arrangements or functions required of any particular IED. In some embodiments, IEDs 104, 106, 108, 115, and 170 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 104, 106, 108, 115, and 170 may be configured to communicate calculations, such as phasors (which may or may not be synchronized as synchrophasors), events, fault distances, differentials, impedances, reactances, frequency, and the like. IEDs 104, 106, 108, 115, and 170 may also communicate settings information, IED identification information, communications information, status information, alarm information, and the like. Information of the types listed above, or more generally, information about the status of monitored equipment, may be generally referred to herein as monitored system data.

In certain embodiments, IEDs 104, 106, 108, 115, and 170 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of system 100. In another example, an IED may be in communication with a recloser and capable of controlling reclosing operations. In another example, an IED may be in communication with a voltage regulator and capable of instructing the voltage regulator to tap up and/or down. In still another example, an IED may be in communication with a capacitor back, which may be selectively connected to an electric power delivery system to provide reactive power and voltage support. Information of the types listed above, or more generally, information or instructions directing an IED or other device to perform a certain action, may be referred to as control instructions.

The electric power delivery system 100 illustrated in FIG. 1 may include a generation substation 111. Substation 111 may include generators 110 and 112, which are connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120. IED 104 may be in communication with a common time source 188 which, as indicated below, may be distributed in system 100 using a communications network or using a universal time source, such as a global positioning system (GPS), or the like. Utilizing a common or universal time source may ensure that IEDs have a synchronized time signal that can be used to generate time synchronized data, such as synchrophasors.

Substation 119 may include a generator 114, which may be a distributed generator, and which may be connected to bus 126 through step-up transformer 118. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

A central IED 170 may be in communication with various IEDs 104, 106, 108, and 115, using a data communications network. IEDs 104, 106, 108, and 115 may be remote from central IED 170. The remote IEDs 104, 106, 108, and 115 may communicate over various media such as a direct communication from IED 170 or over a wide-area communications network 162. IEDs 104, 106, 108, 115, and 170 may be communicatively linked together using a data communications network, and may further be communicatively linked to a central monitoring system, such as a supervisory control and data acquisition (SCADA) system 182, an information system (IS) 190, and/or a wide area control and situational awareness (WCSA) system 180. The data communications network among IEDs 104, 106, 108, 115, and 170 may utilize a variety of network technologies, and may comprise network devices such as modems, routers, firewalls, virtual private network servers, and the like, which are not shown in FIG. 1. IEDs 104, 106, 108, and 115 may be in communication using protection-class communication such as, for example, high-speed peer-to-peer communication channels.

The various IEDs in system 100 may obtain electric power information from monitored equipment using potential transformers (PTs) for voltage measurements (e.g., potential transformer 156), current transformers (CTs) for current measurements (e.g., current transformer 154), and the like. The PTs and CTs may include any device capable of providing outputs that can be used by the IEDs to make potential and current measurements, and may include traditional PTs and CTs, optical PTs and CTs, Rogowski coils, hall-effect sensors, and the like.

Each IED may be configured to access a common time source 188. Common time source 188 may be distributed via a communications network (using, for example, IEEE-1588 protocol, NTP protocol, or the like), or obtained locally at each IED. Common time source 188 may be a universal time, such as that delivered using GPS satellites, WWVB, WWV, or the like. A common time may be used to time-synchronize measurements of the electric power system and/or in the calculation of synchrophasors. Phasors calculated by the IEDs may include a time stamp indicating a time at which the measurement was made.

Central IED 170 may also be in communication with a number of other devices or systems. Such devices or systems may include, for example, a WCSA system 180, SCADA system 182, or local Human-Machine Interface (HMI) 187. Local HMI 187 may be used to change settings, issue control instructions, retrieve an event report, retrieve data, and the like. In some embodiments, WCSA system 180 may receive and process the time-aligned data, and may coordinate time synchronized control actions at the highest level of the electric power delivery system 100. Mass storage device 184 may store data relating to system 100 from IEDs 104, 106, 108, 115, and 170.

Central IED 170 may further include a time input, which may receive a time signal from a central IED time source 186. Central IED time source 186 may also be used by central IED 170 for time stamping information and data. Time synchronization may be helpful for data organization, real-time decision-making, as well as post-event analysis. Time synchronization may further be applied to network communications. Common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a GPS receiver with time decoding. In the absence of a common time source available to all IEDs, central IED 170 may serve as a common time source by distributing a time synchronization signal.

Information system 190 generally includes hardware and software to enable network communication, network security, user administration, Internet and intranet administration, remote network access and the like. Information system 190 may generate information about the network to maintain and sustain a reliable, quality, and secure communications network by running real-time business logic on network security events, perform network diagnostics, optimize network performance, and the like. The embodiments illustrated in FIG. 1 are configured in a star topology having IED 170 at its center; however, other topologies are also contemplated. For example, the IEDs 104, 106, 108, 115, and 170 may be communicatively coupled to each other in a peer-to-peer arrangement. Moreover, a ring topology may be utilized to connect the various IEDs to each other and/or to other systems, such as a SCADA system or a WCSA system 140.

Figure 2:
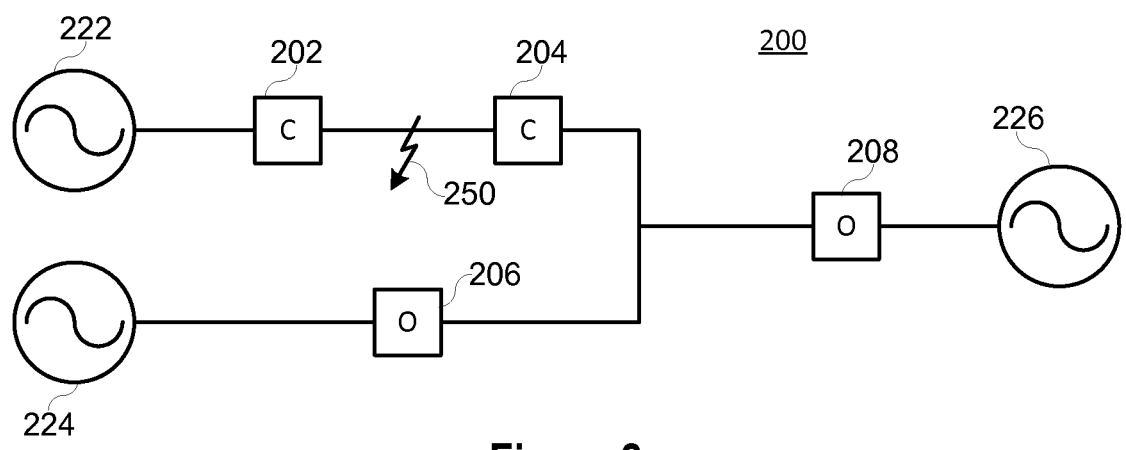
FIG. 2 illustrates a simplified one-line diagram of an electric power delivery system including a permanent fault on the system that causes the upstream recloser to open and lock out consistent with various embodiments disclosed herein.

FIG. 2 illustrates a simplified one-line diagram of an electric power delivery system 200 including a permanent fault 250 on the system 200 that causes the upstream recloser 202 to open and lock out. System 200 includes three power sources 222, 224, and 226 each connected using switching devices (such as, for example, recloser or circuit breakers) 202, 204, 206, and 208. Initially (before the fault) switching devices 202 and 204 are closed, whereas switching devices 206 and 208 are open. All downstream line segments are de-energized. Upon occurrence of the fault 250, switching device 202 opens due to fault protection to isolate the fault 250. Power is then restored to downline customers who experienced an outage but whose line segment was not faulted by closing switching device 206.

In implementing the responses shown in FIG. 2, a distributed control scheme or a central control scheme may be implemented. Distributed control places the decision-making algorithm in the recloser or switch cabinets and substations, usually organizing them into small working groups that provide coordinated switching. Distributed control may allow for a robust system in the sense that if one group loses communication with individual members, it does not affect the other groups in the system; however, distributed control may require a reliable peer-to-peer communications link and may be limited in the ability to make implement control actions based on the condition of the system as a whole.

The presence of an FDIR system on the distribution network introduces the possibility that feeders can change length and complexity in a great number of variations. Accordingly, an adaptive volt/VAR control system may be configured to account for these changes. Accounting for such changes may involve modification of set point and other modifications to control parameters.

According to certain embodiments, in order to coordinate all devices on a feeder, a trip blocking scheme may extend past the substation fence and into the recloser cabinets. According to some embodiments additional logic controllers may be placed in proximity to reclosers. Each logic controller may utilize IEC 61850 GOOSE to multicast its blocking signal over an Ethernet network compartmentalized into virtual local-area networks (VLANs). GOOSE is a Level 2 multicast protocol that uses the extended Ethernet message frame. This extended message frame allows a VLAN identification (ID) to be sent along with every message. The VLAN ID is read by Ethernet switches, which then confine the message to a defined network area. This reduces unnecessary traffic throughout the network. GOOSE messages can also be prioritized by an Ethernet switch, which allows them to be placed in a high-priority queue, bypassing any lower-priority buffering that may be occurring on any given port. Additionally, because they are Layer 2 full-duplex communications, GOOSE messages do not experience delay due to retransmission after an Ethernet collision (there are no Ethernet collisions).

Figure 3A:
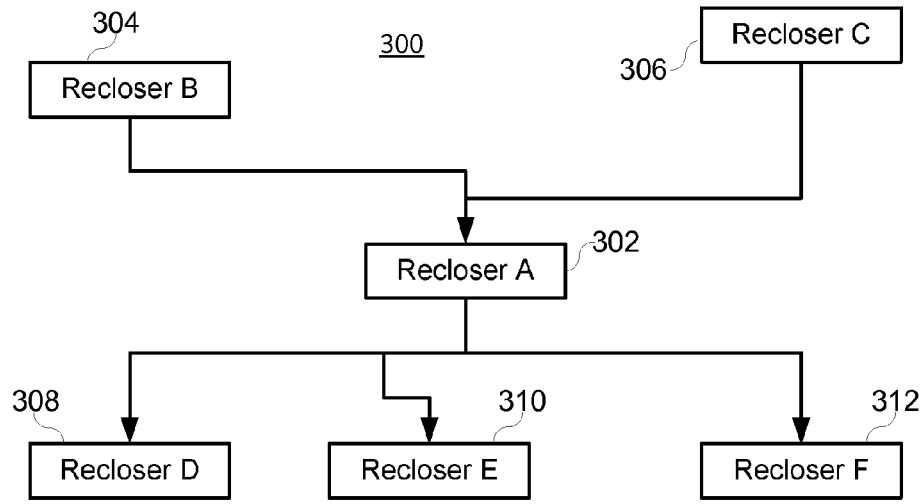
FIG. 3A illustrates an example of a distribution feeder segment including a number of recloser devices.
Figure 3B:
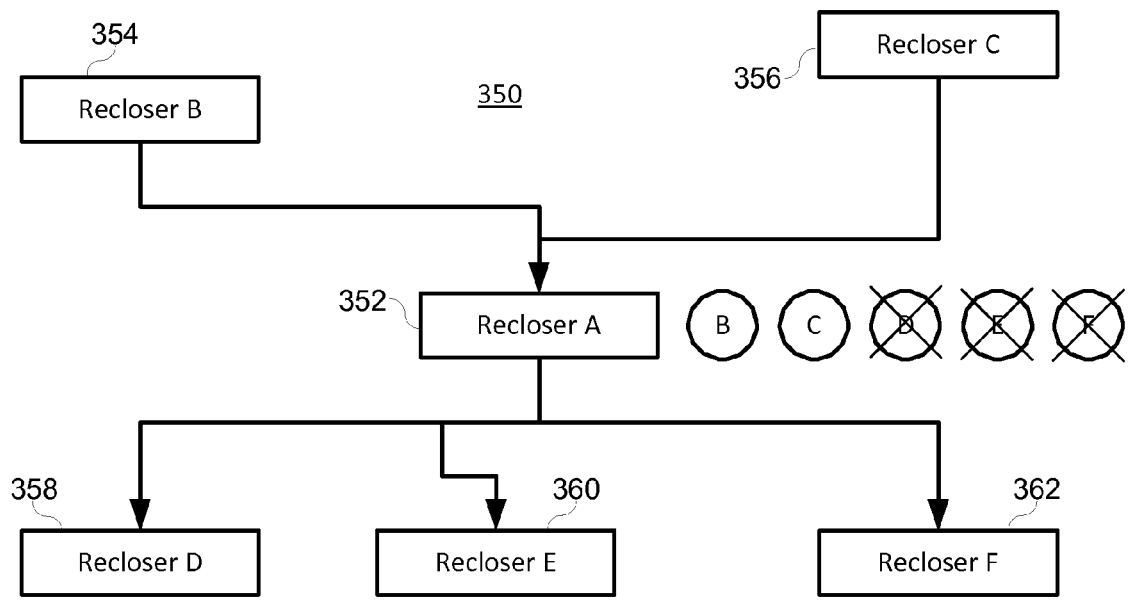
FIG. 3B illustrates a distribution feeder segment illustrating that trip blocking signals received from certain recloses are blocked.

FIG. 3A illustrates an example of a distribution feeder segment 300 including a number of devices 304, 306, 308, 310, 312 adjacent to recloser A 302. The reclosers 302-312 may include a switching device (such as, for example, a recloser) in communication with a local IED (such as, for example, a recloser controller) that includes a logic controller. The arrows in FIG. 3A indicate that the logic controller in recloser A 302 should be passing blocking signals from reclosers D 308, E 310, and F 312, but ignoring any blocking signals received from reclosers B 304 and C 306. FIG. 3B illustrates a distribution feeder segment 350 including a number of devices 354, 356, 358, 360, and 362 adjacent to Recloser A 352. FIG. 3B illustrates that trip blocking signals received from reclosers D 358, E 360, and F 362 are passed along to the recloser control 352. If the flow of power were to be reversed, trip blocking signals from reclosers B 354 and C 356 should be passed along, while signals from reclosers D 358, E 360, and F 362 should be ignored.

According to some embodiments, each recloser location may be assigned a unique identifier. The unique identified may correspond to a geographical location or other identifier (e.g., serial number, MAC address, or the like). The identifier may be set in the logic controller settings inside each cabinet and associated with each recloser device in the FDIR configuration.

The FDIR system may periodically recalculate the topology. According to some embodiments, the recalculation may occur every few seconds. According to other embodiments, the period of recalculation may be shorter or longer. If the topology has changed, an update may be sent to each affected device. The message may identify the unique identifier of the nearest up-line protection device in the new feeder topology. According to some embodiments, this message may be an analog message. A GOOSE data set transmitted by each logic controller may contain an analog and a digital object. The digital object may be the blocking signal value itself. The analog object is set to the unique identifier of the up-line recloser as received by the FDIR system. When a logic controller receives a blocking signal, it may be configured to compare the value of the analog object in the received data set to its own unique identifier. If the two values are equivalent, the blocking signal is forwarded to the recloser control.

Instead of the creation of a series of if-then logic rules for each recloser that are rigid and do not adapt well to changes or additions of lines or devices, the FDIR system may rely on real-time knowledge of the distribution system topology.

Figure 4:
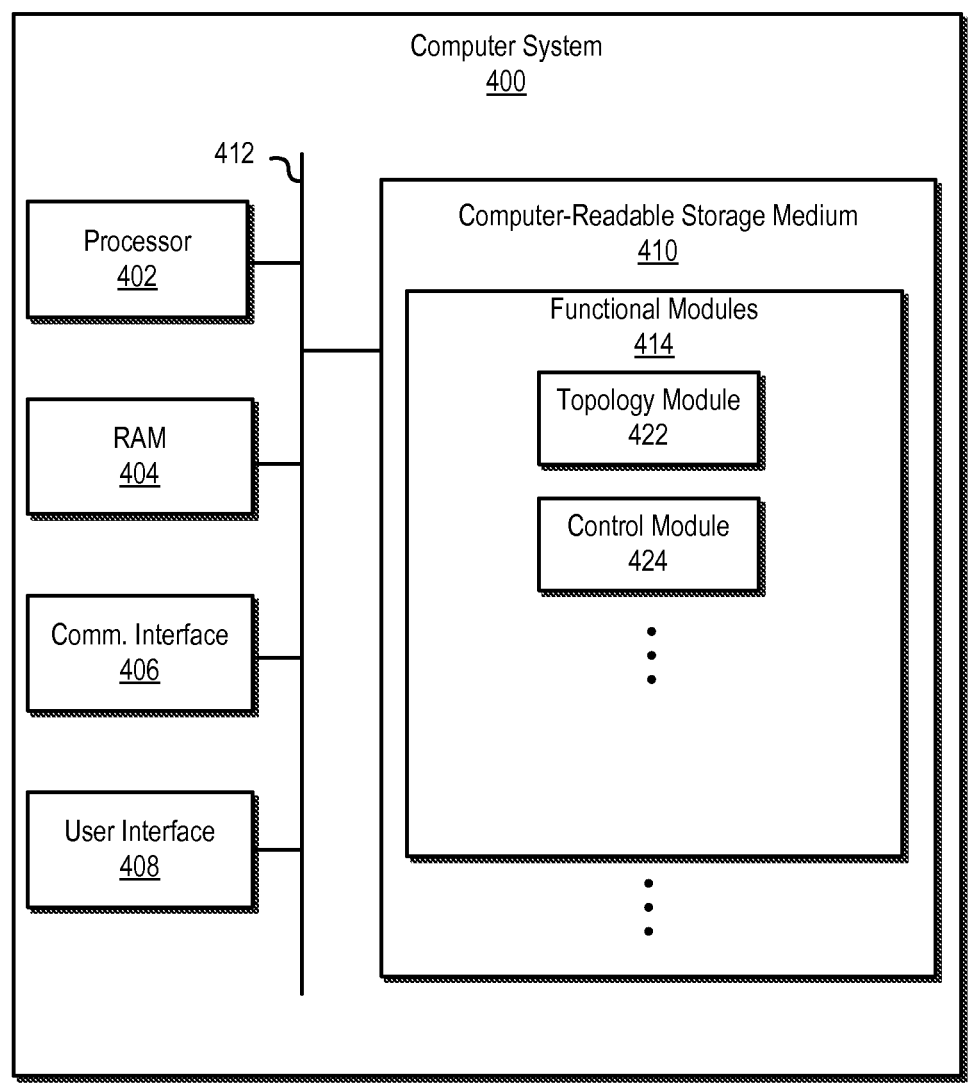
FIG. 4 illustrates a block diagram of a system that may be utilized in implementing certain embodiments of the systems and methods disclosed herein.

FIG. 4 illustrates a block diagram of a system 400 that may be utilized in implementing certain embodiments of the systems and methods disclosed herein. System 400 may include, among other things, one or more processors 402, random access memory (RAM) 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the system 400 may be implemented using hardware, software, firmware, and/or any combination thereof.

User interface 408 may include any number of devices allowing a user to interact with the system 400. For example, user interface 408 may be used to display an interactive interface to a user. The user interface 408 may be a separate interface system communicatively coupled with the system 400 or, alternatively, may be an integrated system such as a display interface. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to system 400. For example, the communications interface 406 may allow the system 400 to communicate with other computer systems (e.g., computer systems associated with external databases, a LAN, a WAN, and/or the Internet), allowing for the transfer as well as reception of data from such systems. The communications interface 406 may include, among other things, a modem, a satellite data transmission system, an Ethernet card, and/or any other suitable device that enables the system 400 to connect to databases and networks, such as LANs, MANs, WANs and the Internet.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules configured to implement all or part of the functionality of the systems and methods described above. Specific functional models that may be stored on computer-readable storage medium 410 include a stack voltage and current characteristics module, a mass activity parameter estimation module, a mass transfer coefficient estimation module, a cell voltage estimation module, a battery control module, and a voltage suppression module.

The system and methods described herein may be implemented independent of the programming language used to create the computer-readable instructions and/or any operating system operating on the system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by system 400 may be in response to user commands, results of previous processing, or a request made by another processing machine. It will be appreciated that system 400 may utilize any suitable operating system including, for example, Unix, DOS, Android, Symbian, Windows, iOS, OSX, Linux, and/or the like.

Figure 5A:
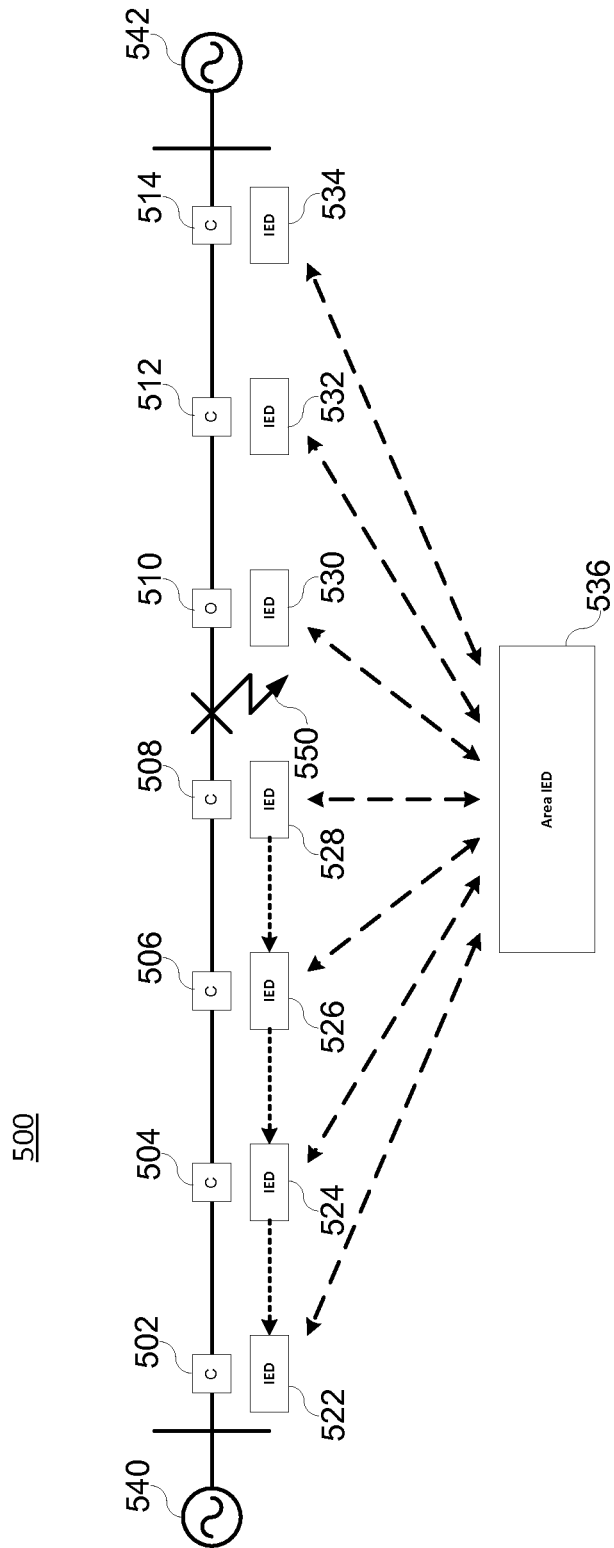
FIG. 5A illustrates a simplified one-line diagram of an electric power delivery system including a permanent fault on the system.

FIG. 5A illustrates an electric power delivery system 500 that includes a set of two radial feeders; each consisting of multiple closed switches. The system includes two sources 540 and 542 that may be connected using the feeders. A number of switching devices 502, 504, 506, 508, 510, 512, and 514 are placed on the feeders for selective opening and closing thereof. Switching devices 502-508 and 512-514 are initially closed, whereas switching device 510 is initially open, resulting in the two radial feeders. Each switching device is in communication with a separate local IED 522, 524, 526, 528, 530, 532, and 534 as illustrated. An area IED 536 is in communication with the local IEDs 522-534. The local IEDs 522-534 may be in communication using protection-class communications such as, for example, high-speed peer-to-peer communications. The local IEDs 522-534 may be in communication with the area IED 536 using SCADA-class communications. The system uses the area IED 536 to track the topology of the feeders and other wide-area conditions. Each local IED 522-534 can broadcast small messages to neighboring local IEDs 522-534 via a communication network. Examples of such a network include IEC-61850 GOOSE and other well established communication methods typically used for communication assisted protection application. This disclosure refers to this type of network as a protection-class network. The area IED 536 gathers larger amounts of data from the local IEDs 522-534 via a slower network typically used for supervisory control and data acquisition (SCADA) applications. This disclosure refers to this type of network as a SCADA-class network. For the purpose of this disclosure, a protection-class network may include a network that provides desirable benefits such as speed, security, and reliability over a SCADA-class network. Note that the protection-class network and the SCADA-class network may be implemented as a single physical network by employing modern prioritization and bandwidth management techniques.

The system illustrated in FIG. 5A includes a permanent fault 550 on the system near the open tie switch 510. Each of the upstream local IEDs 502-508 detects the fault current and asserts a non-directional fault indication (FLT). It is desirable that the closest local IED to the fault will trip to clear the fault. Each local IED 522-528 that detects the fault sends a blocking signal to the local IED upstream thereof. In the illustrated example, local IED 528 detects the fault and sends a blocking signal to local IED 526, which also detects the fault and sends a blocking signal to local IED 524, which also detects the fault and sends a blocking signal to local IED 522. Thus, local IEDs 522-526 are blocked from tripping while the local IED 528 trips switch 508 to clear the fault. As described in more detail below, each local IED that receives a blocking signal 522-526 compares the unique ID in the blocking signal with its own ID, and blocks tripping only if the unique ID in the blocking signal matches its own ID. Each local IED is updated with the ID of the local IED immediately upstream thereof periodically by the area IED 536. Blocking signals may be communicated using the protection class communications, whereas updating local IEDs of upstream local IED IDs by the area IED 536 may be communicated using the SCADA-class communications. Furthermore, local IEDs 522-534 may send information to the area IED 536 such as, for example, switch status, loading, phasors, and the like using the SCADA-class communications.

Figure 5B:
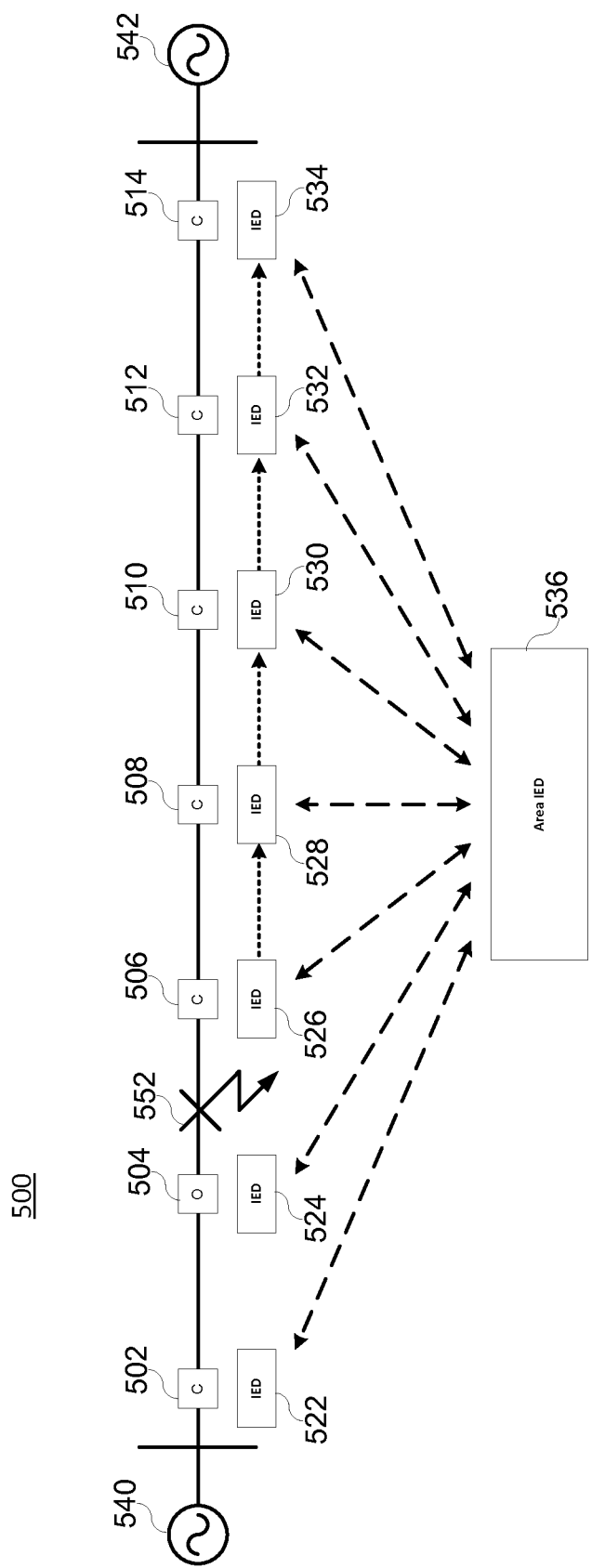
FIG. 5B illustrates the system of FIG. 5A with a different open tie switch location and a fault on the opposite feeder near the open tie switch.

FIG. 5B illustrates the system 500 of FIG. 5A, wherein the open tie switch is switch 504. That is, initially, switch 502 is closed, switch 504 is open, and switches 506-514 are closed. Area IED 536 has been updated with the switch 502-514 statuses by local IEDs 522-534. Fault 552 occurs between switch 504 and 506. As with FIG. 5A, each of the upstream local IEDs 526-534 detect the fault current and assert a non-directional fault indication (FLT). It is desirable that the closest local IED 526 to the fault 552 will trip switch 506 to clear the fault 522. Each local IED 526-534 that detects the fault 552 sends a blocking signal to the local IED immediately upstream therefrom. That is, IED 526 detects the fault and sends a blocking signal to local IED 528, which also detects the fault and sends a blocking signal to local IED 530, which also detects the fault and sends a blocking signal to local IED 532, which also detects the fault and sends a blocking signal to local IED 534. Each local IED 528-534 that receives the blocking signal does not trip its associated switching device 508-514. Local IED 526 does trip its associated switching device 506. As in FIG. 5A, the local IEDs 522-534 have received from the area IED 536 via the SCADA-class communications, the unique IDs of the IED immediately upstream therefrom. Upon detection of the fault, IEDs 526-534 send blocking signals that include the unique IDs of the IEDs immediately upstream therefrom. Upon receipt of the blocking signals, IEDs 528-534 compare the unique IDs in the message with their own IDs. If the unique IDs in the message matches their own ID, then the local IEDs 528-534 block their trip signals, and their associated switching devices 508-514 remain closed. Local IED 526 did not receive such a blocking message, and so did not block tripping, and its associated switching device 506 opens, clearing the fault 552.

The area IED 536 may contain a broader context of the surrounding power system 500 than does the individual local IEDs 522-534. The area IED 536 may use switch status and other related data are collected from the local IEDs 522-534 via the SCADA communication network and combined with prior knowledge about the relationships between devices to form a model of the power system 500 topology.

The area IED 536 uses unique identifiers (IDs) for the local IEDs 522-534 in the system to inform the local IEDs 522-534 in the system of relevant aspects of the topology to ensure proper interpretation of the blocking signals. These IDs may be analog quantities or encoded Boolean points.

Figure 6:
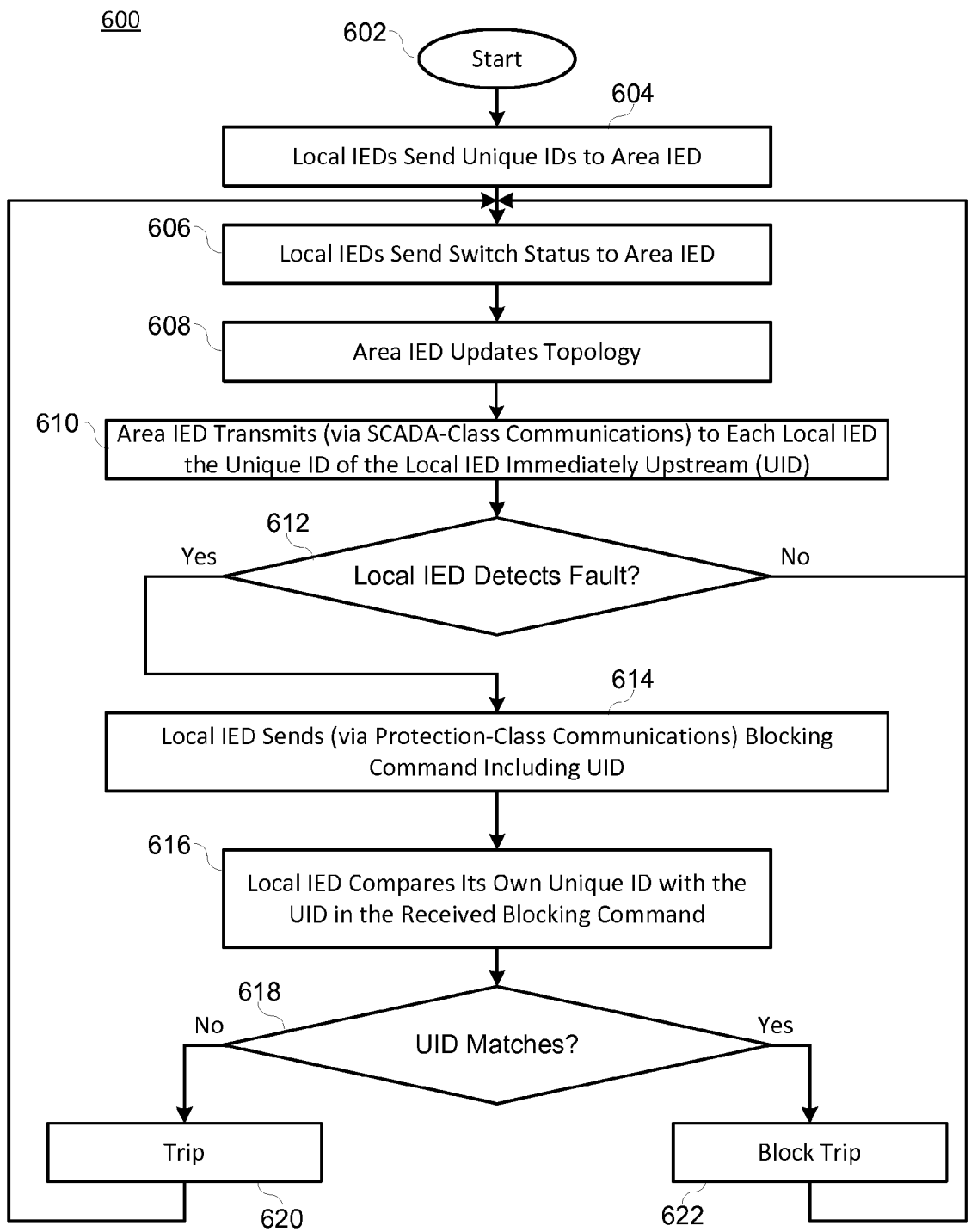
FIG. 6 illustrates a method for adaptive communication assisted protection and control with wide area context consistent with the present disclosure.

FIG. 6 illustrates one embodiment of a method 600 for adaptive communication assisted protection and control with wide area context consistent with the present disclosure. The method 600 starts 602 with each of the local IEDs (such as, for example, local IEDs 522-534 of FIGS. 5A and 5B) sending their own unique IDs to the area IED (such as, for example area IED 536 of FIGS. 5A and 5B). Each local IED in the system may have been previously assigned a unique identifier, which may be set by a user or automatically generated by the device. The unique IDs of each local IEDs may be communicated to the area IED using the SCADA-speed communications network.

The local IEDs send 606 switch status to the area IED. Using the switch status, the area IED updates the topology 608 stored and/or tracked by the area IED. With the topology information, the area IED may determine for each local ID the ID of the local IED directly upstream therefrom. The area IED transmits to each local IED the unique ID of the local IED immediately upstream (UID) of the local IED 610. Such transmission may be using the SCADA-class communications. Each local IED proceeds to monitor the electric power delivery system and, if the local IED does not detect a fault 612, then the method returns to the local IED sending switch status to the area IED 606 as illustrated. Although the method as illustrated returns to sending switch status to the area IED 606, the method may return to any of steps 606-610. In one specific embodiment, the local IED simply continues to monitor the electric power delivery system and determining whether a fault is detected 612.

Upon detection of a fault 612, the local IED sends a blocking command (via the protection-class communications) including the UID 614 (the blocking command includes the ID of the local ID immediately upstream of the local IED sending the blocking command, where the UID was originally supplied to the local IED by the area IED). The local IED may send the blocking command to all neighboring devices via the protection-class network. When the other local IEDs receive the blocking command, each local IED compares its own unique ID with the UID in the received blocking command 616. If the UID in the received blocking command matches the unique ID of the receiving IED 618, then the receiving IED blocks tripping 622, and the method returns to step 606 (or any of steps 604-612). If, however, the UID in the received blocking command does not match the unique ID of the receiving IED 618, then the receiving IED does not block tripping 620 (that is, it does not block a tripping signal to its associated circuit breaker due to the blocking command, although it should be understood that the local IED may have other algorithms running that may block the tripping signal). The method then returns to step 606.

Various systems and methods consistent with the present disclosure may allow the wide area context (e.g., topology) to inform local decisions with limited degradation of the overall speed of the system response. Each local IED may make a comparison of whether the identifier embedded in the blocking message (BID) is equal to the identifier of the local device (ID).

In the described embodiment the pertinent topology information is simply the ID of the upstream protection device. The present disclosure may be extended to a variety of applications, including, but not limited to: Direct Transfer Trip (DTT); Direct Underreaching Transfer Trip (DUTT); Permissive Overreaching Transfer Trip (POTT); Permissive Underreaching Transfer Trip (PUTT); Directional comparison blocking (DCB); Directional comparison unblocking (DCUB); and the like.

Furthermore, the above example describes only trip blocking messages. It should be understood that various types of messages may be communicated with the unique ID of the device immediately upstream. For example, the message may be a step-up or step-down message for a voltage regulator control, and include the ID of the local IED. Upon receipt, as discussed above, the receiving IED may compare the unique ID in the message with its own ID and only accept the command if the unique ID in the message matches its own ID. Any other command that may be communicated between IEDs may be used such as, for example, trip blocking, open switching device, close switching device, transformer tap up, transformer tap down, block transformer tap, connect capacitor bank, disconnect capacitor bank, modify generator setpoints, modify storage setpoints, block reclosing, unblocking reclosing, enable sensitive settings, disable sensitive settings, change setting groups, adjust voltage setpoints, adjust power factor setpoints, curtail distributed generation, release distributed generation, and the like.

Figure 7:
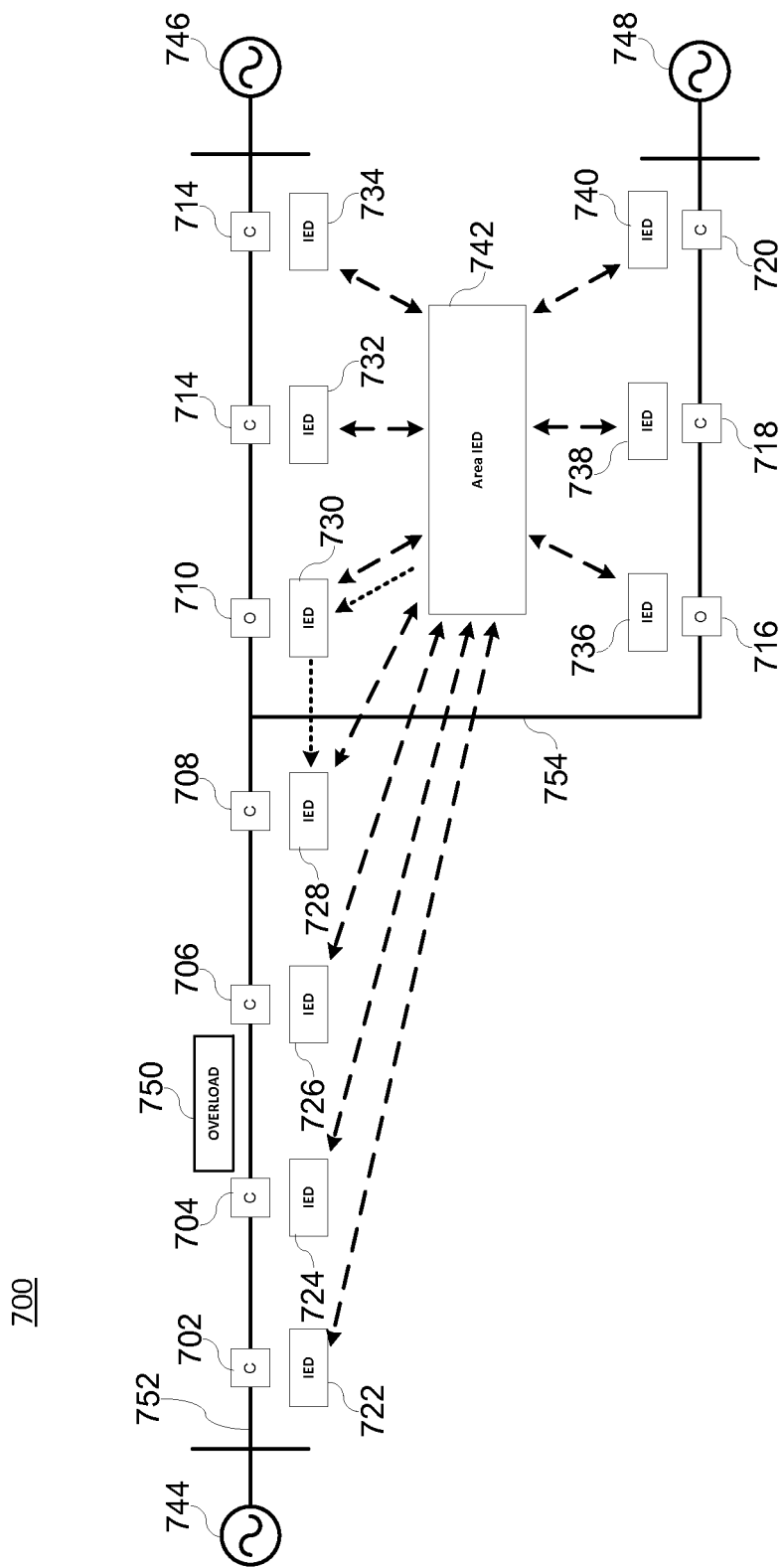
FIG. 7 illustrates a simplified one-line diagram of an electric power delivery system including on overload condition.

FIG. 7 illustrates a simplified one-line diagram of an electric power delivery system 700 including on overload condition 750. As illustrated in connection with FIG. 7, the present disclosure may also be applied to control-related applications. One control related embodiment is automatic load transfer for the purpose of overload mitigation or load balancing. The electric power delivery system 700 includes three sources 744, 746, and 748. Sources 744 and 746 are connected with line 752 (which may be a transmission line, distribution line, or the like). Source 748 is connected using line 754 to line 752. Line 752 includes a number of switching devices 702, 704, 706, 708, 710, 712 and 714. Line 754 is connected to line 752 between switching devices 708 and 710, and includes switching devices 716, 718, 720. Switching devices 710 and 716 are initially open and all other switching devices are initially closed. As with previously described embodiments, each switching device 702-720 is associated with a local IED such as local IEDs 722, 724, 726, 728, 730, 732, 734, 736, 738, and 740. Local IEDs 722-740 may be configured to monitor the electric power delivery system and control associated switching devices. Also illustrated is an area IED 742 in communication with each of the local IEDs 722-740. As described in previous embodiments, the area IED 742 may be in communication with the local IEDs 722-740 using a first (or SCADA-class) communications network, where each of the local IEDs may be in communication with each other using a second (or protection-class) communications network.

The area IED 742 contains a broader context of the surrounding power system than the individual local IEDs 722-740. Switch status, load levels, voltage levels, and other related data are collected from the local IEDs 722-740 via the SCADA-class communication network. These data are combined in the area IED 742 with prior knowledge about the relationships between devices and equipment/conductor capacity ratings to form a model of the power system.

The area IED 742 selects a load transfer action from the available possibilities. In the example shown in FIG. 7, load could be transferred by closing switch 710 and opening switch 702, 704, 706, or 708. Alternately, load could be transferred by closing switch 716 and opening switch 702, 704, 706, or 708. The area IED 742 has the necessary wide area context to select the best course of action. The selected action will include closing one switch followed by opening a second switch. The area IED 742 could accomplish this using the SCADA network alone by sending the close command to the first local IED, waiting for the first local IED to respond with confirmation of the close operation, then sending the open command to the second local IED. This may result in two radial circuits being tied together for several seconds due to the time lag introduced by the SCADA network.

Alternately, the protection-class network can be utilized to complete the load transfer more quickly. The current disclosure may be used to enable the close transition load transfer to complete quickly while still taking advantage of the wide area context. In this case, the area IED 742 initiates the load transfer by sending a message to the local IED associates with the selected switch-to-close. This load transfer message may include the ID of the switch that should be subsequently opened. Once the first local IED confirms the local switch associated therewith is closed, it forms an open message consisting of the open signal and the ID of the IED associated with the switch-to-open as informed earlier by the area IED 742. The local IED then sends the open message to all neighboring devices via the protection-class network, where the message includes the ID of the IED associated with the switch-to-open as informed earlier by the area IED 742. Local IEDs that receive the open message compare their own ID with the ID that is embedded in the received message. If the IDs match then the open signal is accepted. If the IDs do not match then the open signal is rejected.

In this manner the area IED 742 uses unique identifiers for the switches in the system to inform the local IEDs in the system of relevant aspects of the topology to ensure proper interpretation of the open signals.

In another embodiment, the area ID may be used for open transition switching. The area IED 742 selects the two switches 702-720 that must be operated to transfer load. In this case, the area IED 742 may initiate the load transfer by sending a message to the local IED associated with the selected switch-to-open. This load transfer message may include the ID of the local IED associated with the switch that should be subsequently closed. Once the first local IED confirms the local switch is open it forms a close message consisting of the close signal and the ID of the IED associated with the switch-to-close as informed earlier by the area IED. The local IED then sends the close message to all neighboring local IEDs via the protection-class network. Local IEDs that receive the close message compare their own ID with the ID that is embedded in the received message. If the IDs match then the close signal is accepted by the local IED receiving the message. If the IDs do not match then the close signal is rejected by the local IED receiving the message.

In particular, the area IED 742 may determine that switch 710 should open followed by switch 716 closing. Area IED 742 may then send a message to the local IEDs 702-740 using the SCADA-class communication network, where the message includes the unique ID of local IED 730 (associated with switch 710) with the open command, and the unique ID of the local IED 736 (associated with switch 716) with the close command. Upon receipt, each local IED 722-740 compares the first unique ID in the message with their own unique ID. Local IED 730 will determine that the first unique ID in the message matches its own unique ID. All other local IEDs will reject the message from the area IED 742, while local IED 730 will accept the message, command its associated switching device 710 to open, and then send a message including the unique ID of local IED 736 and the close command. Upon reception of this second message from IED 730, each local IED will compare the unique ID therein with its own unique ID. Local IED 736 will determine that the unique ID in the message matches its own unique ID, and will accept the message while the other IEDs will reject the message due to the unique ID therein not matching the unique IDs of the other local IEDs. Local IED 736 will then command its associated switching device 716 to close. At each or various stages, local IEDs 722-740 may communicate switch status to the area IED 742, and area IED 742 may use the switch status information to update its topology (or context) of the electric power delivery system.

Figure 8:
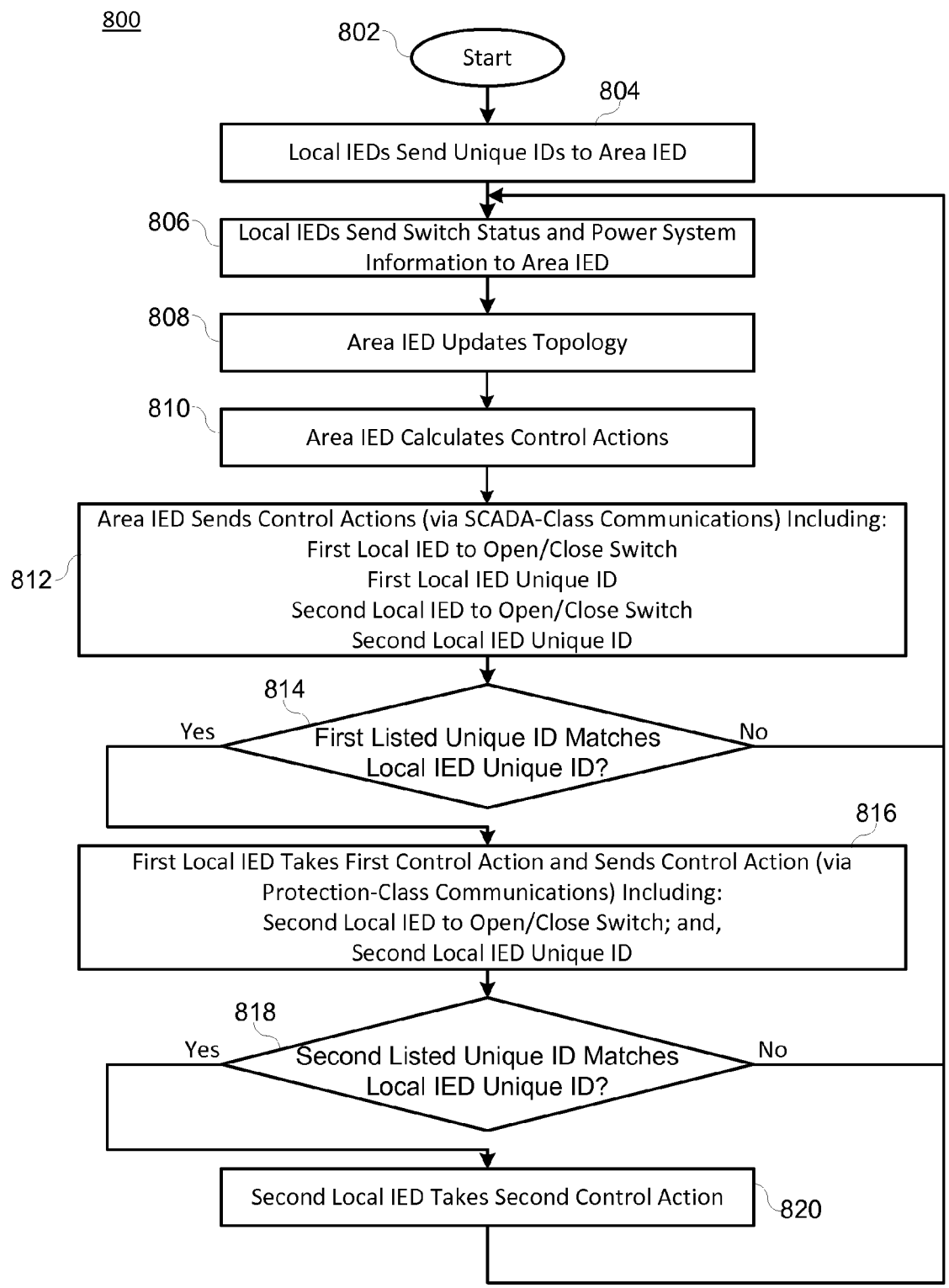
FIG. 8 illustrates a method for adaptive communication assisted protection and control with wide area context consistent with the present disclosure.

FIG. 8 illustrates one embodiment of a method 800 for adaptive communication assisted control of an electric power delivery system. The method 800 starts 802 with each of the local IEDs (such as, for example, local IEDs 722-740 of FIG. 7) sending their own unique IDs to the area IED (such as, for example, area IED 742 of FIG. 7). Each local IED may send switch status of the switch associated therewith and power system information to the area IED 806. The power system information may include information such as current, voltage, frequency, loading, phasors, synchrophasors, and the like. The area IED may use the switch status information to update topology 808. The area IED may use the electric power system information from the local IEDs to calculate control actions 810. Control actions may include, for example, close transition load transfer, open transition load transfer, fault isolation, load restoration, load sectionalizing, coordinated voltage control device operation, and the like. The area IED may then send control actions including the first local IED to open or close its associated switch; the first local IED unique ID; the second local IED to open or close its associated switch; and, the second local IED unique ID 812. The message may be sent using the SCADA-class communication system.

Upon reception of the message from the area IED, the local IEDs compare the first listed unique ID with their own unique ID. If the first listed unique ID does not match the local IED ID 814, then the method returns to step 806. If, however, the first listed unique ID does match the local IED ID 814, then the first local IED takes the first control action and sends a control action that includes a command to the second local IED to open or close its associated switch, along with the unique ID of the second local IED 816. This communication may be via protection-class communications. Upon receipt of the second message, each IED compares its own ID with the unique ID in the message. If the second listed unique ID does not match the IED ID 818, then the method returns to step 806. If, however, the second listed unique ID does match the IED ID 818, then the second local IED takes the second control action 820 (opens or closes its associated switching device), and the method returns to step 806. It should be noted that upon return to step 806 after steps 814, 818, or 820, the local IEDs may update the associated switch status to the area IED 806 and the area IED updates its topology 808.

It should be noted that although the above examples are provided with open and close operations, the embodiments herein may include any of the many available commands that may be issued from an IED to its monitored equipment. Further, although the above examples indicate only two steps, several steps may be undertaken using the embodiments described herein. That is, the IED may determine commands such as trip blocking, open switching device, close switching device, transformer tap up, transformer tap down, block transformer tap, connect capacitor bank, disconnect capacitor bank, modify generator setpoints, modify storage setpoints, block reclosing, unblocking reclosing, enable sensitive settings, disable sensitive settings, change setting groups, adjust voltage setpoints, adjust power factor setpoints, curtail distributed generation, release distributed generation, and the like. The area IED may determine several steps to undertake, whereas the local IEDs exchange the step information as described above using the protection-class communication network.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for control of electric power delivery, comprising:
   a plurality of switching devices for opening and closing at various locations on en electric power delivery system;
   a plurality of local intelligent electronic devices (IEDs), each local IED of the plurality of local IEDs:
   in communication with one of the plurality of switching devices;
   comprising a unique ID;
   in communication with the electric power delivery system for obtaining electric power information therefrom; and
   comprising a communication module for sending power system information and receiving command information;
   an area IED comprising:
   a topology module for maintaining and updating a topology of the electric power delivery system;
   a communication module for receiving electric power system information from the local IEDs and transmitting to each local IED the unique ID of the local IED immediately upstream of the local IED; and, a communication network in communication with the communication modules of the area IED and each of the local IEDs;

wherein upon detection of a fault, each local IED that detected the fault transmits a blocking message that includes the unique ID of the IED immediately upstream therefrom; and, wherein each local IED blocks opening of its associated switching device upon receipt of a blocking message that includes its unique ID.

2. The system of claim 1, wherein each local IED does not block opening of its associated switching device upon receipt of no blocking messages including its unique ID.

3. The system of claim 1, wherein the communication network comprises:

a control-class communication network for communication of the unique ID information; and, a protection-class communication network for communication of protection information.

4. The system of claim 3, wherein the control-class communication network and the protection-class communication network comprise the same physical network.

5. The system of claim 3, wherein the control-class communication network comprises a Supervisory Control and Data Acquisition (SCADA) network.

6. The system of claim 1, wherein the unique ID of each of the local IEDs comprise unique IDs of the switching devices associated with the local IEDs.

7. The system of claim 1, wherein the unique ID of each of the local IEDs comprise a MAC address of each of the local IEDs.

8. The system of claim 1, wherein the topology module of the area IED is configured to update the topology using electric power system information from the local IEDs.

9. The system of claim 1, wherein upon update of the topology, the area IED is configured to communicate to each local IED an updated unique ID of the local IED immediately upstream of the particular local IED.

10. The system of claim 3, wherein the area IED is configured to transmit to each local IED the unique ID of the local IED immediately upstream of the local IED using the control-class communication network.

11. A system for control of electric power delivery, comprising:

a plurality of switching devices for opening and closing at various locations on en electric power delivery system;

a plurality of local intelligent electronic devices (IEDs), each local IED of the plurality of local IEDs:

in communication with one of the plurality of switching devices;

comprising a unique ID;

in communication with the electric power delivery system for obtaining electric power information therefrom; and comprising a communication module for sending and receiving electric power system information and protection information;

an area IED comprising:

a topology module for maintaining and updating a topology of the electric power delivery system;

a control module for calculating control actions that include open and close commands for specific switches; and, a communication module for receiving electric power system information from the local IEDs and transmitting the calculated control actions to the local IEDs; and, a communication network in communication with the communication modules of the area IED and each of the local IEDs;

wherein upon calculation of a control action, the area IED is configured to transmit a command comprising:

the unique ID of a first local IED;

a command for the first local IED to open or close its associated switching device;

a unique ID of a second local IED; and a command for the second local IED to open or close its associated switching device; and wherein the first local IED, upon receipt of the command from the area IED and matching of its unique ID with the unique ID of the first local IED in the command, the local IED is configured to:

open or close its associated switching device; and transmit a command comprising:

the unique ID of the second local IED; and the command for the second local IED to open or close its associated switching device.

12. The system of claim 11, wherein upon receipt of the command from the first local IED and matching of its unique ID with the unique ID of the second local IED in the command, the second IED is configured to open or close its associated switching device.

13. The system of claim 11, wherein the communication network comprises:

a control-class communication network for communication of the unique ID information; and, a protection-class communication network for communication of protection information.

14. The system of claim 13, wherein the control-class communication network and the protection-class communication network comprise the same physical network.

15. The system of claim 13, wherein the control-class communication network comprises a Supervisory Control and Data Acquisition (SCADA) network.

16. The system of claim 13, wherein the command from the area IED is communicated using the control-class communication network.

17. The system of claim 11, wherein the control module comprises detection of an overload condition, and calculation of which switches to open and which switches to close to ameliorate the overload condition.

18. The system of claim 11, wherein the control module comprises load transfer calculations.

19. The system of claim 11, wherein the control module comprises one selected from the group consisting of: direct transfer trip calculations; direct underreaching transfer trip calculations; permissive overreaching transfer trip calculations; permissive underreaching transfer trip calculations; directional comparison blocking calculations; directional comparison unblocking calculations; and combinations thereof.

20. A method for protecting an electric power delivery system, comprising:

each local intelligent electronic device (IED) of a plurality of local IEDs obtaining local electric power system information from the electric power delivery system;

each local IED obtaining switch status information from associated switching device of a plurality of switching devices;

each local IED transmitting switch status information and local IED unique ID information to an area IED;
the area IED calculating a topology of the electric power system using the switch status information from the local IEDs;
the area IED calculating for each local IED the unique ID of the local IED immediately upstream of the local IED using the topology;
the area IED transmitting to each local IED the unique ID of the local IED calculated to be immediately upstream of the local IED;
upon detection of a fault using the obtained local electric power system information, each local IED transmitting a command that includes the unique ID of the local IED immediately upstream of the local IED, as was received from the area IED;
upon receipt of a command, each local IED comparing its own unique ID with the unique ID in the command and when the unique IDs match, the local IED performing the command.

21. The method of claim 20, wherein the area IED transmits the unique ID of the local IED calculated to be immediately upstream of the local IED using a control-class communication network.

22. The method of claim 20, wherein each local IED transmits the blocking command using a protection-class communication network.

23. The method of claim 20, wherein the command comprises a blocking command, and when the unique ID and the unique ID in the blocking command match, the local IED blocking the tripping of its associated switching device.

24. A method for protecting an electric power delivery system, comprising:
each local intelligent electronic device (IED) of a plurality of local IEDs obtaining local electric power system information from the electric power delivery system;
each local IED obtaining switch status information from associated switching device of a plurality of switching devices;
each local IED transmitting switch status information, local IED unique ID information, and electric power system information to an area IED;
the area IED calculating a topology of the electric power system using the switch status information from the local IEDs;
the area IED calculating control actions using the calculated topology and the received electric power system information;
the area IED transmitting a command comprising:
the unique ID of a first local IED;
a command for the first local IED;
a unique ID of a second local IED; and
a command for the second local IED;
the first local IED receiving the command from the area IED;
the first local IED performing the command for the first local IED;
the first local IED transmitting a command comprising:
the unique ID of the second local IED; and
a command for the second local IED;
the second local IED receiving the command from the first local IED;
the second IED performing the command for the second local IED.

25. The method of claim 24, wherein the area IED transmits the command using a control-class communication network.

26. The method of claim 24, wherein the control actions comprise overload protection transferring load from a first power source to a second power source.

27. The method of claim 24, wherein the step of calculating control actions further comprises calculating a margin using a rated capacity and a current load from the electric power system information transmitted from the local IEDs.

28. The method of claim 24, wherein the command for the first local IED comprises opening or closing a switching device.

29. The method of claim 24, wherein the command for the first local IED comprises one selected from the group consisting of: trip blocking, open switching device, close switching device, transformer tap up, transformer tap down, block transformer tap, connect capacitor bank, disconnect capacitor bank, modify generator setpoints, modify storage setpoints, block reclosing, unblocking reclosing, enable sensitive settings, disable sensitive settings, change setting groups, adjust voltage setpoints, adjust power factor setpoints, curtail distributed generation, release distributed generation, and combinations thereof.

* * * * *